United States Patent [19]

Fonck

[11] 4,334,440

[45] Jun. 15, 1982

[54] AUTOMATIC TRANSMISSION

[76] Inventor: Hugo Fonck, 200 Richardson Dr., Mill Valley, Calif. 94941

[21] Appl. No.: 128,670

[22] Filed: Mar. 10, 1980

Related U.S. Application Data

[63] Continuation-in-part of Ser. No. 950,128, Oct. 10, 1978, abandoned.

[51] Int. Cl.³ .................. F16H 57/10; F16H 3/44; F16H 3/74
[52] U.S. Cl. .................. 74/789; 74/751; 74/752 B; 74/793
[58] Field of Search ............ 74/751, 793, 789, 750 R, 74/752 B, 768, 753, 674, 705, 758, 759, 801, 640

[56] References Cited

U.S. PATENT DOCUMENTS

| 1,953,252 | 4/1934 | Mueller | 74/751 |
| 2,003,108 | 5/1935 | Dodge | 74/751 X |
| 2,101,233 | 12/1937 | Bancroft | 74/752 B |
| 2,174,835 | 10/1939 | Rainsford | 74/752 B |
| 2,234,384 | 3/1941 | Ryan | 74/752 B |
| 2,719,441 | 10/1955 | Wassau | 74/750 R |
| 3,899,941 | 8/1975 | Cook | 74/751 X |

FOREIGN PATENT DOCUMENTS

| 962031 | 7/1949 | Fed. Rep. of Germany | 74/751 |
| 2350651 | 5/1974 | Fed. Rep. of Germany | 74/793 |

Primary Examiner—Leslie Braun
Assistant Examiner—Lawrence J. Gotts
Attorney, Agent, or Firm—William W. Haefliger

[57] ABSTRACT

A continuously varying transmission employs gears only, and includes three gear sets A, B and C, each including first, second and third gears; the first gears of the A and C sets are interconnected to rotate together, and the first gear of the B set is connected to the third gear of the C set to rotate as a unit; and the second gear (or gears) of the A set is connected by carrier structure to the third gear of the B set to rotate as a unit and to allow rotation of the second gear (or gears) relative to the third gear of the B set.

10 Claims, 2 Drawing Figures

U.S. Patent     Jun. 15, 1982     4,334,440
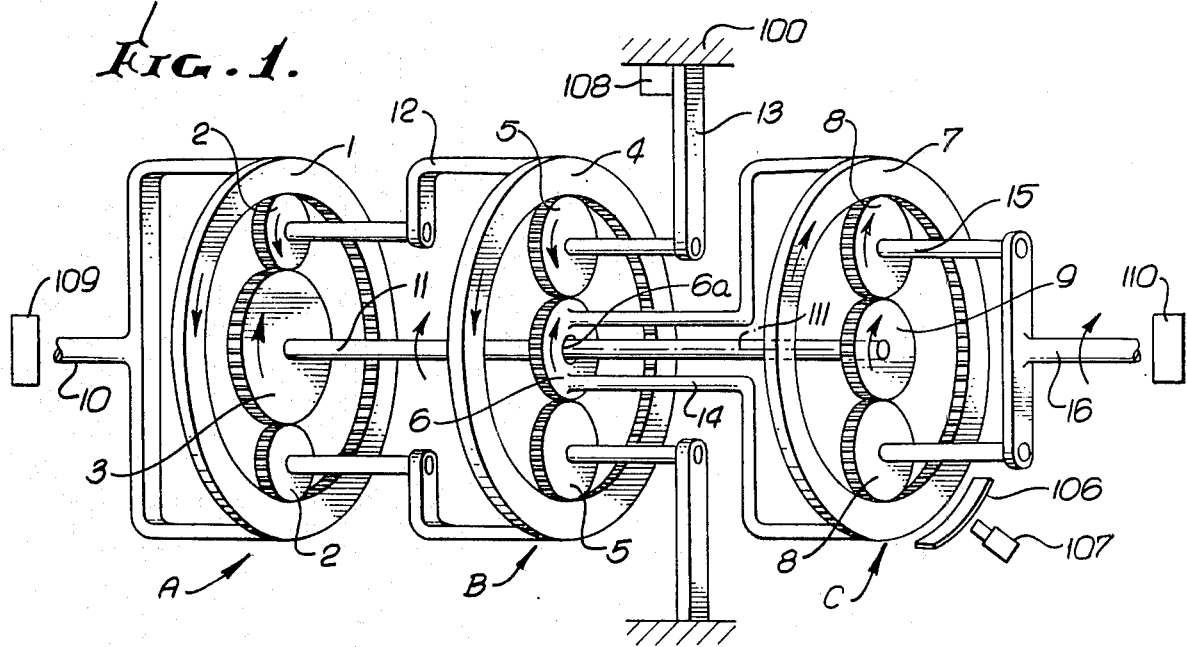
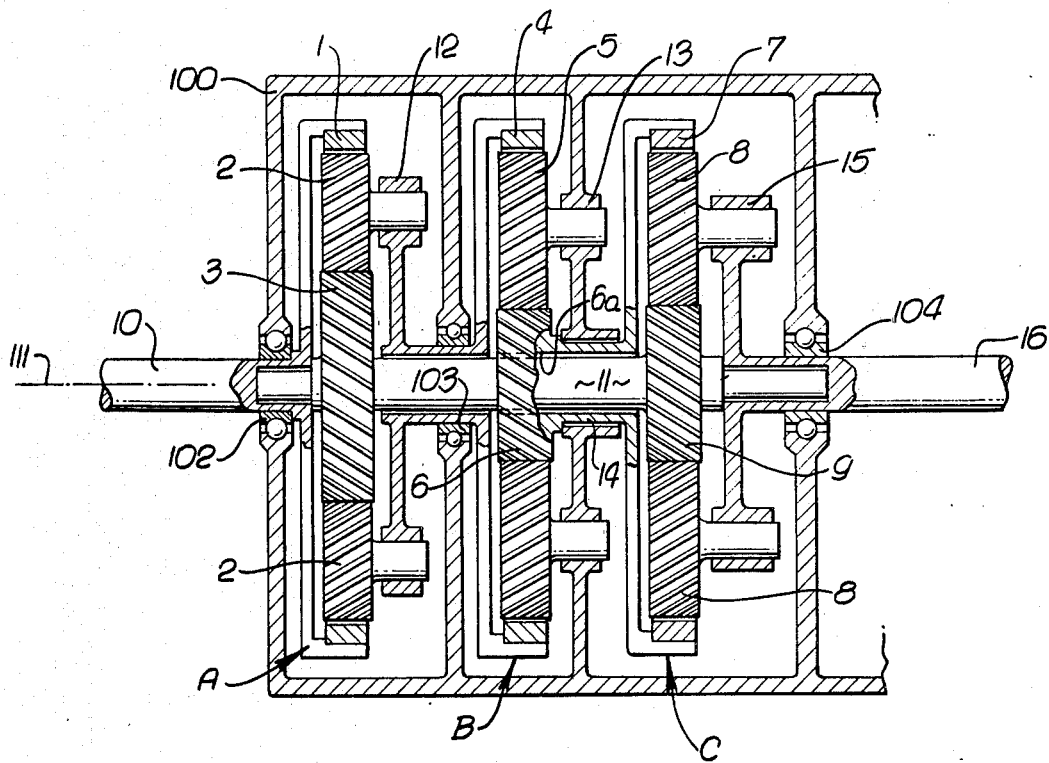

AUTOMATIC TRANSMISSION

BACKGROUND OF THE INVENTION

This application is a continuation-in-part of my prior application Ser. No. 950,128, filed Oct. 10, 1978, now abandoned.

This invention relates generally to continuously varying automatic transmissions, to provide continuously varying speed and torque conversion by mechanical means, as for example gears only, induced by changing resistance to rotation imposed on the driven shaft. The invention is especially useful as a transmission for motor driven vehicles, but has other industrial applications, as well.

There is a continuous need for simplifications of transmission systems, and particularly a need to reduce the costs of same. While fluid transmissions have many desirable features, their torque conversion mechanism is not activated automatically, but, as in the case of automobiles, by depression of the accelerator pedal, and they do require constant attention and maintenance, and brake bands associated with such transmissions need adjustment and replacement. Especially needed is a simple continuously varying (rather than continuously variable) automatic transmission employing gears only.

SUMMARY OF THE INVENTION

It is a major object of the invention to provide a transmission meeting the above need. Basically, the transmission comprises:

(a) first, second and third gear sets, each including sun, planet and ring gears, (b) the sun gears of the first and third gear sets being interconnected to rotate together, and the sun gear of the second set connected to the ring gear of the third set to rotate as a unit, (c) and the planet gear or gears of the first set connected by gear carrier structure to the ring gear of the second set to rotate as a unit and to allow rotation of said planet gear or gears relative to the ring gear of the third set.

As will be seen, means is typically provided to hold the planet gear or gears of the second set against rotation about the sun gear of the second set but allowing that planet gear or gears to rotate in position; primary rotary means provides input to the ring gear of the first set while secondary rotary means is connected to the planet gear or gears of the third set to be rotated and provide output; and the sun gears of the first and third sets are typically interconnected, as by a shaft extending through the sun gear of the second set.

These and other objects and advantages of the invention, as well as the details of an illustrative embodiment, will be more fully understood from the following description and drawings, in which:

DRAWING DESCRIPTION

FIG. 1 is a schematic view of a transmission embodying the invention; and

FIG. 2 is a vertical elevation, in section, showing another embodiment of the invention.

DETAILED DESCRIPTION

As shown in the drawings, first, second and third epicyclic gear sets appear at A, B and C. Set A includes ring gear 1, two planet gears 2 and sun gear 3; set B includes ring gear 4, two planet gears 5 and sun gear 6; and set C includes ring gear 7, two planet gears 8 and sun gear 9. The sun gears 3 and 9 of the first and third sets are interconnected as by a shaft 11 to rotate together; and the sun gear 6 of the second set B is connected as by carrier 14 to the ring gear 7 of the third set C to rotate as a unit. Further, the planet gears 2 of the first set A are connected as by a carrier 12 to the ring gear 4 of the second set B to rotate as a unit; and the planet gears 5 of the second set B are connected to carrier 13 attached to housing 100, so that the gears 5 rotate in position but do not bodily rotate about axis 111 defined by shaft 11. Finally, input shaft 10 is connected to ring gear 1; output shaft 16 connected by carrier 15 to planet gears 8; and shaft 11 passes coaxially through an opening 6a in sun gear 6. In FIG. 2, shaft and carrier bearings are provided at 102-104.

Both output torque and rotations and torque reaction with reverse rotations, resulting from main input torque and rotations acting on first gear set A, are used to transmit torque and rotations to second and third gear sets B and C. The output torque of the first gear set A, acting through gears 2 on gear carrier 12 becomes the input torque of the 2nd gear set B, whose output torque acts through gears 5 on gear carrier 13 (connected to transmission housing) of this set in order to provide overall torque reaction of the transmission, while gear 6 provides torque reaction for the torque reaction gear 7 of set C. The torque reaction gear 3 of set A provides the drive torque for gear set C by means of shaft 11 and drive gear 9. Gears 8 connected to gear carrier 15 transmit final output torque and rotations driven shaft 16. Rotation of gears 6 and 7 as well as rotation and torque of output shaft 16 are reversed with regard to main input torque and rotation.

The basic feature of this transmission will be its high or "direct" gear ratio equation $$\frac{RA \cdot BB}{1 - RA \cdot BB} = 1.0,$$

which is the most practical value for transmissions of this type and indicates that input and output torques and rotations equal each other in high or "direct" gear.

If "x" is the desired maximum range between "high gear" and "low gear" performance of the transmission and RA, RB and RC are the overall gear ratios of the individual gear sets A, B and C, then these required ratios for each desired "x" are obtained from the following equations:

(Eq. 1.) $\frac{RB}{1 - RB} - \left(1 + \frac{RB}{1 - RB}\right) \cdot (RC) = \frac{1}{x}$ (gear ratios)

(Eq. 2.) $\frac{1 - RB}{RA \cdot RB} + \frac{1 - RA}{RA} =$ 1.0 (torques and torque reactions)

(Eq. 3.) $\frac{1 - RB}{RA \cdot RB} - \left(\frac{1 - RB}{RA \cdot RB}\right) \cdot (RC) =$ $\frac{1 - RA}{RA}$ (torques and torque reactions)

(from 1.), $RC = RB - \frac{RB}{x} - \frac{1}{x}$

-continued (from 2.), $RA = \frac{1}{2RB}$ (from 3.), RB to be obtained from quadratic equation below:

$$RB^2 + \frac{RB^2}{x} 3RB - \frac{2RB}{x} + \frac{1}{x} + \frac{3}{2} = 0$$

Equations Nos. 2 and 3 above indicate how torques and torque reactions are balanced in this transmission, assuming a main input torque of 1.0.

Furthermore "torques" and "torque reactions" in equations Nos. 2 and 3 are to be understood in such a way, that the torque reaction of one gear set may become the input torque—or part thereof—of another gear set.

Maximum output torque occurs at one full forward rotation (per one main input forward rotation) of the whole set A, of ring gear 4 of gear set B and of gear 9 of set C, while the interconnected assembly of gear 6, gear carrier 14 and ring gear 7 of set C will rotate in reverse and together with forward rotation of gear 9 will cause minimum reverse rotations (and maximum torque) of driven shaft 16 by means of gears 8 and gear carrier 15.

Driven torque and rotations will gradually become equal to the drive torque and rotations as soon as the resistance on the driven shaft 16 decreases (neglecting gear friction for this explanation), in which case the torque reaction gear of set A will go into reverse rotation while at the same time the driven member of this same set, gear carrier 12, by means of gears 2, will slow down and with it gear 6 of set B and the torque reaction member 7 of set C and gear carrier 15 of set C with driven shaft 16 will reach the same reverse rotation as torque reaction gear 3 of set A."

The following numerical example will further explain the transmission design:

Assume desired x=4; then the quadratic equation for RB will be transformed into $$\frac{5RB^2}{4} - \frac{7RB}{2} + \frac{7}{4} = 0 \text{ and } RB^2 - \frac{14}{5}RB + \frac{7}{5} = 0;$$

$$RB = 1.4 - \sqrt{1.96 - 1.4} = 1.4 - 0.74833 = 0.651668$$

$$RA = \frac{1}{2RB} = \frac{1}{1.303337} = 0.76726$$

$$RC = RB + \frac{RB}{4} - \frac{1}{4} = 0.651668 + \frac{0.651668}{4} -$$

$$0.25 = 0.564585$$

Check: high gear ratio = 1.0 low gear ratio = $\frac{RB}{1-RB} - \left(1 + \frac{RB}{1-RB}\right) \cdot (RC) =$ $\frac{1}{x} = \frac{1}{4};$ $\frac{0.651668}{0.348332} - \left(1 + \frac{0.651668}{0.348332}\right) \cdot (0.564585) = 1.870824 -$ $(2.870824) \cdot (0.564585) = 1.870824 - 1.620824 = 0.250000 = \frac{1}{4}.$ In practice the gear set ratios obtained above would have to be modified in order to be in accordance with actual and technically possible gear teeth numbers, which modification also would change the value of "x" somewhat.

If the resistance on the driven shaft remains constant, but the main input torque increases, then this transmission will automatically change from a lower into a higher output speed in order that the product of angular velocity times torque at the driven end always remains equal with the same product at the drive-end of the transmission.

As part of an automobile power transmission system, the transmission described herein is not able to make maximum use of the engine braking power for "downhill" travel without the aid of a coupling (friction coupling or any other type of coupling) between gear 3 of set A and drive shaft 10, which have to be joined in order to obtain the highest number of rotations of the main drive shaft for maximum engine braking power. In this case the whole set A will rotate as a unit with the drive shaft, which is now the "driven" shaft of the transmission.

Since there are no brakes (except as noted below), freewheeling or other supplementing devices used on this transmission and no slippage or loss of power except by gear friction is possible, continuous speed and torque conversion will take place at any stage above the low gear limit of the transmission described above.

The fact that output torque and rotations of this transmission are reversed with regard to the input torque and rotations can easily be corrected if required by the addition of a minimum of two gears at one end of the transmission, which then would offset either drive or driven shaft from the central shaft of the transmission. Choosing an appropriate ratio of such two added gears will result in possible overdrive action of the transmission, but in such a case the factor "x" of the transmission design equation would have to be large enough to make up for the additional overdrive capacity. Overdrive action of the transmission may also be obtained by stopping ring gear 7 of gear set C with the help of a band-brake 106 with actuator 107.

In the case of automobiles etc., a forward-reverse gear set with shifting device would have to be added to the transmission, preferably at its drive end and possible combined with a hydraulic or friction coupling or clutch, to be able to separate the transmission, which is always "in gear", from the engine. But such a coupling also could be provided as interruption of the fixed connection of the driven gears 5 with gear carrier 13 to the transmission housing instead, in which case the forward-reverse gear set, where required, would have to be added at the driven end of the transmission. See such devices at 108–110 in FIG. 1.

Reviewing the operation, in "low gear" mode, rotary input in shaft 10 to ring gear 1 effects same full forward rotation of whole gear set A and of sun gear 9. Planet gears 8 then rotate with ring gear 7 and carrier 15 rotates "reversely" to provide reverse direction, maximum torque output at shaft 16.

In "cruise" mode, gears 3 and 9 rotate in reverse, and gear 2 and carrier 12 forwardly somewhat. Gear 6 rotates reversely as do carrier 14 and ring gear 7 (same rotation as gears 3 and 9).

The transmission can be made using regular gears (other than ring gears) only, as long as the same interconnections are made between the various torque transmitting and torque reaction members. In this regard, sun, planet and ring gears can be replaced by first, second and third gears.

I claim:

1. In a continuously varying automatic transmission, the combination comprising
   (a) first, second and third gear sets spaced apart coaxially in that sequence, each including sun, planet and ring gears,
   (b) the sun gears of the first and third gear sets being interconnected to rotate together, and the sun gear of the second set connected to the ring gear of the third set to rotate as a unit,
   (c) and the planet gear or gears of the first set directly connected by planet gear carrier structure to the ring gear of the second set to rotate bodily therewith as a unit, said planet gear or gears of the first set being carried only by said carrier structure to allow rotation of said first set planet gear or gears relative to said carrier structure and relative to the ring gear of the second set, about an axis or axes defined by said planet gear or gears, the planet gear or gears of the second set at all times held by holding structure against rotation about an axis defined by said second gear.

2. The combination of claim 1 including means holding the planet gear or gears of the second set against rotation about the sun gear of the second set but allowing said planet gear or gears to rotate in position.

3. The combination of claim 1 including primary rotary means connected to the ring gear of the first set, and secondary rotary means connected to the planet gear or gears of the third set.

4. The combination of claim 1 including drive means directly interconnecting the sun gears of the first and third sets, said drive means extending through the sun gear of the second set.

5. The combination of claim 1 wherein all three sets are coaxial.

6. The combination of claim 3 wherein said secondary rotary means comprises a carrier mounting the planet gear or gears of the third set for rotation as a unit about an axis defined by the sun gear of the third set, and for rotation relative to the carrier, the carrier transmitting output rotation.

7. In a continuously varying automatic transmission, the combination comprising
   (a) A, B and C gear sets spaced apart coaxially in that sequence, each including interconnected first, second and third gears,
   (b) the first gears of the A and C gear sets being interconnected to rotate together, and the first gear of the B set connected to the third gear of the C set to rotate as a unit,
   (c) and the second gear or gears of the A set directly connected by second gear carrier structure to the third gear of the B set to rotate bodily therewith, as a unit, said second gear or gears of the A set being carried only by said carrier structure to allow rotation of said A set second gear or gears relative to said carrier structure and relative to the third gear of the B set about an axis or axes defined by said A set second gear or gears, the B set second gear or gears at all times being held by holding structure against rotation about an axis defined by the A and C set first gears,
   (d) and including primary rotary means connected to the third gear of the A set, and free of direct connection to the second gear or gears of the A set.

8. The combination of claim 7 including means holding the second gear or gears of the B set against rotation about the first gear of the B set but allowing said second gear or gears to rotate in position.

9. The combination of claim 7 including secondary rotary means connected to the second gear or gears of the C set.

10. The combination of claim 7 including drive means directly interconnected the first gears of the A and C sets, said drive means extending through the first gear of the B set.